United States Patent Office 3,592,646
Patented July 13, 1971

3,592,646

DIAZO COMPOUNDS AND PHOTOGRAPHIC ELEMENTS

Colin Holstead, Abbotts Langley, England, and Wojciech Maria Prezezdziecki, Rochester, N.Y., assignors to Eastman Kodak Company, Rochester, N.Y.

No Drawing. Filed Mar. 20, 1968, Ser. No. 714,415
Claims priority, application Great Britain, Mar. 31, 1967, 14,953/67
Int. Cl. G03f *7/08;* G03c *1/54*
U.S. Cl. 96—33 19 Claims

ABSTRACT OF THE DISCLOSURE

A light-sensitive 1,2-diazo ketone trihalomethane compound is employed in photographic elements with or without gelatin or an alkali-insoluble polymer wherein both positive or negative images are obtained with utility in photomechanical reproductions and photoresist applications.

This invention relates to photography and especially to positive-working and negative-working, diazo-sensitized photographic elements having particular utility in the photomechanical reproduction and photoresist arts.

Photographic elements incorporating azide-sensitized light hardenable polymers are well known. Such negative-working elements are prepared by coating a support with an azide sensitizer and a polymer. After exposure, the unhardened polymer is removed by solvent development, leaving an exposed, imagewise distribution of hydrophobic, ink-receptive polymer on the support material. Such developed photographic elements can, depending on the choice of support, choice of polymer and coating thickness, function as masters for lithographic printing, as masters for relief printing or as resist stencils for etching operations. The prior art also discloses negative-working systems which involve a base material coated only with a suitable diazo compound. Solvent development removes the unexposed material, forming a suitable master for lithographic printing.

Positive-working photographic elements for photomechanical and photo-resist operations are also known in the art. Their preparation involves coating a base material with a diazo sensitizer-alkali-soluble polymer mixture in which the amount of sensitizer often equals the amount of polymeric material. Exposure to light increases the alkali solubility of the initially alkali-soluble polymer, so that subsequent development in a dilute alkaline solution removes the more alkali-soluble polymer in the areas of exposure. The undisssolved polymer image is a positive reproduction of the original pattern, and such a developed photographic element can produce positive copies by photomechanical means.

In negative-working systems, on the one hand, it is advantageous to simplify or eliminate the development step. Solvent treatment is the presently utilized technique, generally requiring the use of organic materials. On the other hand, in positive-working systems, high sensitizer concentrations are needed to assure adequate photographic response, the amount of sensitizer often equalling the polymer's weight. Additionally, current positive working photographic elements which exhibit utility in photomechanical reproduction are restricted to initially alkali-soluble polymers, such as phenol-aldehyde polymers (e.g., resole type), which are rendered additionally alkali soluble upon exposure to ultraviolet light.

Accordingly, an object of this invention is to provide novel diazo sensitizers which are advantageously employed in light-sensitive photographic elements designed particularly for the preparation of printing masters and for the preparation of photoresist stencils.

It is also an object of the present invention to provide a novel, negative-working photographic element that functions without either a polymeric component or subsequent solvent development.

It is another object of this invention to provide new photographic elements incorporating relatively small amounts of a diazo sensitizer.

Still another object of the present invention is to provide novel positive-working photographic elements utilizing substantially non-alkali soluble polymers.

Yet another object of the instant invention is to provide new photographic masters for lithographic printing.

Still another object of this invention is to provide novel photographic masters for relief printing.

An additional object of the present invention is to provide new photoresists for etching purposes.

Yet an additional object of this invention is to provide a novel photographic process for preparing masters for lithographic and relief printing.

Still another object of the instant invention is to provide a new photographic process for preparing photoresist stencils.

Another object is to provide a novel diazo compound.

Still additional objects will become apparent from a consideration of the following description and appended claims.

The objects of this invention are accomplished with a 1,2-diazoketone trihalomethane. The present 1,2 - diazoketone trihalomethanes are light-sensitive and when coated on a support, they function advantageously in both negative-working and positive-working photographic elements. The 1,2-diazoketone trihalomethanes described herein can be coated either alone or in combination with a polymer such as gelatin or a polyester, a polyamide or the like, including mixtures thereof.

1,2-diazoketone trihalomethanes of this invention include those having a formula selected from:

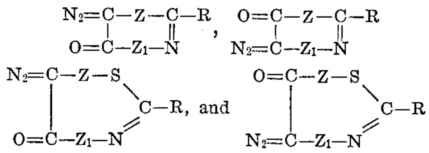

wherein R is a trihalomethyl radical, and Z and $Z_1$ represent the atoms necessary to complete a nucleus having at least 9 atoms and typically 9 to 18 atoms.

Of the 1,2-diazoketone trihalomethanes described herein, particularly useful compounds include those having the formulas:

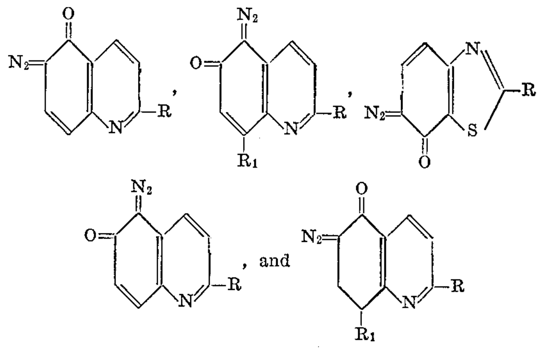

wherein R is a trihalomethyl radical and $R_1$ is either a halogen atom or a lower alkyl radical. Lower alkyl radicals as comprehended herein include branched and straight chain substituted and unsubstituted alkyl radicals having from 1 to 6 carbon atoms an preferably from 1 to 4 carbon atoms. Preferred 1,2-diazoketone trihalomethanes include 5,6-dihydro-6-diazo-2-tribromomethyl quinoline-5-one, 5-bromo-8-diazo-7,8-dihydro-2-tribromomethyl quinoline-7-one, 5,6-dihydro-5-diazo - 8 - bromo-2-tribromomethyl quinoline-6-one, 6-diazo-6,7-dihydro-2-tribromomethyl benzothiazole-7-one, 5,6-dihydro - 6 - diazo-2-trichloromethyl quinoline-5-one, and 5,6-dihydro-6-diazo-8-methyl-2-tribromomethyl quinoline-5-one.

The above described 1,2-diazoketone trihalomethanes can be coated from solution upon a support material to provide a negative-working photographic element which is advantageously employed in photomechanical reproduction, especially lithographic printing. No additional polymeric material is required in the light-sensitive layer. Additionally, no solvent development step is required. Upon an imagewise exposure to actinic light, a print-out image is obtained in the exposed areas. This image is hydrophobic and readily accepts a greasy printing ink. Hydrated, unexposed areas do not accept the ink, and the exposed photographic element produces a highly acceptable master for lithographic printing. The nature of the support for the photographic element can be widely varied. Particularly useful supports are those porous supports, such as paper, to whose surface the light-sensitive trihalomethane derivative can be readily adsorbed.

Coating thickness for the above described negative-working elements can be widely varied but is typically thin, generally varying between about .1 mil and 3 mils. The only restrictions imposed, however, are the technological limitations imposed by the present state of advancement of the coating art. The method of coating can be any known by those skilled in the art. Whirler coating, dipping, swabbing, hopper coating and doctor blade coating, for example, are all suitable techniques.

A second type of negative-working photographic element which is particularly suited to relief printing operations is produced by coating a support material with a mixture of the 1,2-diazoketone trihalomethane and gelatin. The percentage of light-sensitive trihalomethane to gelatin can vary considerably, with a range of from about 5 percent to about 50 percent, based on the total weight of both trihalomethane and gelatin, being typically employed.

Coating of the second type of negative-working element can be accomplished by any of the techniques noted above. In like manner, the choice of support can be widely varied. In this instance, however, more highly absorptive support materials are not to be preferred over other supports, since the gelatin functions in part as a binder. Coating thickness can be widely varied, with thicknesses of from less than 1 mil to over 7 mils being advantageously employed. For relief printing purposes, coating thickness of between about 3 and about 5 mils, are preferred.

An imagewise actinic light exposure through an original pattern renders the exposed element oleophilic and hydrophobic in the areas of exposure. Development in warm water, generally at least about 90° F., dissolves away the coated layer in the unexposed areas, producing a printing plate which reproduces a negative image of the original pattern.

The present diazoketone trihalomethanes are also advantageously employed in positive-working photographic elements, wherein a support is coated with a light-sensitive layer that includes the trihalomethane as a sensitizer and a substantially alkali-insoluble polymer component. A wide variety of polymers can be advantageously employed in the positive-working photographic elements described herein.

Suitable polymers include such unsaturated polyesters derived from polyols and unsaturated polycarboxylic acids as are described in the copending application of Mench et al. Photographic Element and Process, Ser. No. 693,710, filed Dec. 27, 1967 and currently copending herewith. Polyols which are advantageously employed in producing the polyesters utilized in this invention include both aliphatic and alicyclic polyols. Suitable aliphatic polyols can be, for example, such polyhydroxy compounds as lower alkane glycols having from 1 to 6 carbon atoms and homopolymers or copolymers of hydroxy substituted lower alkyl acrylate esters wherein the alkyl moiety has from 1 to 6 carbon atoms. Specific aliphatic polyols which exhibit particular utility in preparing the subject polyesters are, for example, ethylene glycol, 2,2-di(4-hydroxyethylphenyl)-propane, neopentyl glycol, polyvinyl alcohol and poly or copoly acrylates wherein at least part of the acrylate is a hydroxy-alkyl acrylate such as poly(hydroxyethylacrylate) and copoly(hydroxyethylacrylatermethylacrylate). Alicyclic polyols suitably employed in preparing the subject polyesters include cyclic alkanes having from 5 to 7 atoms in the carbocyclic nucleus, 1,4-dihydroxymethylcyclohexane for example, and polyhydroxy-containing carbohydrates such as cellulosic compounds including substituted cellulose derivatives of which hydroxy-propyl cellulose is an example.

Unsaturated carboxylic acids which can be advantageously employed in the practice of this invention include compounds having the general formula:

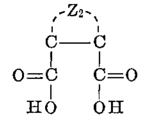

wherein $Z_2$ represents the atoms necessary to form an unsaturated bridged or unbridged carbocyclic nucleus typically having 6 to 7 carbon atoms. Such a carbocyclic nucleus can be substituted or unsubstituted. Particularly suitable acid units are 4-cyclohexene-1,2-dicarboxylic acid, 5-norbornene-2,3-dicarboxylic acid, hexachloro-5[2:2:1]bicycloheptane-2,3-dicarboxylic acid and the like.

Such unsaturated polycarboxylic acids readily polycondense with the above described polyols to form the polyesters useful in preparation of the present light-sensitive compositions. Mixtures of more than one polyol or more than one unsaturated polycarboxylic acid can be used. The subject polyesters are of two varieties, either essentially straight chain copolymers of a monomeric polyol and one of the unsaturated acids of this invention or copolymers incorporating an initially polymeric polyol and the subject acid units as side chains. Particularly suitable polyesters include, for example, the esterification products of: polyvinyl alcohol and cis-4-cyclohexene-1,2-dicarboxylic acid; cellulose and cis - 4 - cyclohexene - 1,2-dicarboxylic acid; hydroxypropylcellulose and cis-4-cyclohexene-1,2-dicarboxylic acid; polyvinyl alcohol, benzoyl chloride and cis-4-cyclohexene - 1,2 - dicarboxylic acid; methyl acrylate/hydroxyethyl acrylate copolymer and cis-4-cyclohexene-1,2-dicarboxylic acid; the polycondensation product of ethylene glycol and cis-4-cyclohexene-1,2-dicarboxylic acid; and ethylene glycol, cis-4-cyclohexene-1,2-dicarboxylic acid and hexachloro-5-[2:2:1]-bicycloheptene - 2,3 - dicarboxylic acid. Additionally, amounts of other acids, such as terephthalic acid, or acid salts or esters can be incorporated into the reaction mixture to obtain particular desired polymer or reaction characteristics.

Other useful polymers are alcohol-soluble polymers containing amide groups which are described in the copending application Ser. No. 602,581, filed December 19, 1966, now abandoned. Such polymers include homopolymers of recurring acryloylpeptide units having the formulas:

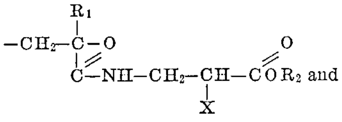

and

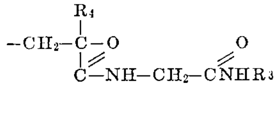

wherein $R_1$ and $R_4$ are each either a hydrogen atom or a lower alkyl radical, $R_2$ is a lower alkyl radical, $R_3$ is either a lower alkyl radical or a radical having the formula $$-CH_2-\overset{O}{\overset{\|}{C}}OR_5$$

(wherein $R_5$ is a lower alkyl radical) and X is $$-CH_2CH_2\overset{O}{\overset{\|}{C}}OR_7$$

(wherein $R_7$ is a lower alkyl radical) or a lower alkyl radical or a hydrogen atom. These alcohol-soluble acryloylpeptide derivative polymers can also be copolymers of the above mentioned acryloylpeptide units with at least one recurring unit having the formulas:

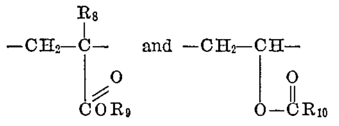

wherein $R_8$ is either a lower alkyl radical or a hydrogen atom, and both $R_9$ and $R_{10}$ are lower alkyl radicals. Such a copolymer is, for example, copoly(methylacrylate, N-acryloyl-N'-butyl-glycinamide). Additionally, mixtures of the polyesters and other polymers described herein are advantageously used as the polymer component.

The preparation of a positive-working photographic element is accomplished by solvent coating a combination of a polymer and a 1,2-diazoketone trihalomethane sensitizer on a support material. The choice of a coating solvent varies between polymers, but all such solvents are easily determined by one skilled in the art. Coating can be accomplished by any means. Whirler coating, dipping, swabbing, hopper coating and doctor blade coating are examples of suitably employed techniques. In the coating solution, the amount of the 1,2-diazoketone trihalomethane sensitizer can be widely varied, with from about 5 percent by weight to over 40 percent by weight of the accompanying polymer being illustrative. Typically, between 10 and 30 weight percent of sensitizer to polymer component is preferred. The total weight of sensitizer and polymer can also be widely varied, with about 2 percent by weight to over 30 weight percent of the final coating solution being illustrative. The particular percentage of solids in any given coating is dependent upon the use to which the photographic element will be applied. Coating thickness is also a function of intended use, and its limits are only those imposed by the concentration of the coating solution and the state of advancement attained by the coating art. Generally, however, coating thicknesses of between 1 mil and 4 mils are employed.

The choice of support upon which the sensitized polymer for positive-working systems is coated can be widely varied and is typically a function of that use to which the developed photographic element will be applied. Metal laminates, where a thin layer of a metal such as copper is bonded to a polymeric base material, are particularly suitable where subsequent etching is involved, such as in the production of printed circuits.

When the coated positive-working photographic elements are exposed to actinic light through an original pattern, the substantially alkali insoluble polymers are rendered suitably soluble (in the areas of exposure) in dilute alkaline solutions such as sodium and potassium hydroxide or trisodium phosphate. The mechanism of this reaction is not fully understood, but one explanation for the shift in solubility is a light-initiated reaction wherein the diazoketone configurations form solubilizing carboxylic acid groups on the sensitizer described herein (5,6-dihydro-6-diazo-2-tribromomethylquinoline - 5 - one, for example), and the sensitizer is presumably grafted onto the polymer by means of the photoactive trihalomethyl group, thus attaching the solubilizing acid group to the polymer and imparting alkali solubility.

Development of the positive-working photographic elements containing polymers is carried out with a dilute aqueous alkaline solution, such as those noted above, and which alkaline solution is susceptible of a wide variation in concentration. Typically, the alkaline developing solutions vary from about 1 to 20 weight percent of alkaline material to total solution, with the need for one concentration, rather than another, depending upon polymer concentrations, coating thickness and intensity of exposure. The concentration can be more extensively varied, however, in accordance with usual practices. Treatment of the exposed element with developer solution causes the highly alkali soluble material in the exposed areas to dissolve away. This developing treatment can be accomplished by dipping, spraying, swabbing, and other techniques which permit the developer solvent to contact the exposed element for a period of time sufficient to selectively dissolve away the alkali-soluble polymer in the areas of exposure.

After development, the polymer-containing positive-working photographic element bears a polymer image which is a positive reproduction of the original pattern. This image is hydrophobic and ink receptive, and such developed photographic elements function advantageously in photomechanical reproduction operations as masters for lithographic printing and as masters for relief printing. They also function as resist stencils for etching operations and the like.

Support materials for all of the above described photographic elements can be metals, such as copper, aluminum, zinc and the like. They can also be conventional photographic film bases such as cellulose nitrate, polystyrene, cellulose acetate, cellulose acetate butyrate, poly(ethylene terephthalate), paper including polyethylene-coated and polypropylene-coated paper, and the like. Other support materials are well known in the prior art.

The negative-working and positive-working photographic elements described hereinabove, exhibit utility in both the photomechanical reproduction and photoresist art. Such utility will become more obvious by considering the following examples of preferred embodiments thereof, which serve to further illustrate the present invention.

EXAMPLE 1

5,6-dihydro-6-diazo-2-tribromomethylquinoline - 5-one is prepared from an intermediate, 6-acetamido-5-bromo-2-tribromomethylquinoline, which in turn is prepared from 6-acetamidoquinaldine. A mixture of 6-acetamidoquinaldine, (21.0 g.) (Hamer, J. Chem. Soc. 119, 1435) and anhydrous sodium acetate (90 g.) in glacial acetic acid (210 ml.) is heated to 70° C. and a solution of bromine (67.2 g.) in glacial acetic acid (90 ml.) is added over 30 minutes with stirring. After addition, the temperature is raised to 92° C., with heating being then continued for 90 minutes. The reaction mixture is cooled to room temperature and allowed to stand overnight. The crystalline solid is filtered off, washed with a little acetic acid and finally washed well with water, to give 49.5 g. (95%) of product. One crystallization from glacial acetic acid gives pure 6-acetamido-5-bromo-2-tribromomethylquinoline (45.0 g.); M.P. 194–5° C. with decomposition. 6-acetamido-5-bromo-2-tribromomethylquinoline (3 g.) is gradually added at room temperature to 98% concentrated sulfuric acid (9 mls.) with stirring. The clear solution is heated on a steam bath for ten minutes and then cooled to 15° C. Solid sodium nitrite (0.41 g.) is gradually added and stirring continued for 30 minutes. The reaction mixture is poured into ice (50 g.) and allowed to stand at 0° C. for 30 minutes. The pale yellow crystalline diazonium salt is filtered off, washed with a little ice cold 25% sulfuric acid and immediately dissolved, while still damp, in 50% aqueous alcohol (100 ml.) at room temperature. Addition of aqueous saturated sodium acetate (10 ml.) gives an immediate precipitate. The mixture is stirred at room temperature for 30 minutes and the product collected (2.0 g.). One crystallization from alcohol gives pure 5,6-dihydro-6-diazo-2-tribromomethylquinoline-5-one.

EXAMPLE 2

5 - bromo - 8 - diazo-7,8-dihydro-2-tribromomethylquinoline-7-one is prepared from an intermediate, 8-acetamido-5,7-dibromo-2-tribromomethylquinoline which in turn is prepared from 8-acetamidoquinaldine, each preparation being according to the procedure of Example 1, except that 8-acetamidoquinaldine (7 g.) is mixed with anhydrous sodium acetate (30 g.) in glacial acetic acid (74 ml.) and after heating to 70° C., a solution of bromine (28 g.) in glacial acetic acid (24 ml.) is added according to the method of Example 1. Pure 8-acetamido-5,7-dibromo-2-tribromomethylquinoline (10.6 g.) is obtained upon recrystallization from glacial acetic acid, M.P. 191–2° C. with decomposition. Then, a portion of the 8 - acetamido-5,7-dibromo-2-tribromomethylquinoline (6 g.) is reacted as described in Example 1, except using 18 ml. of 98% concentrated sulfuric acid and 100 g. of ice. Additionally, the diazonium salt is suspended in water, rather than being dissolved in alcohol. A precipitate is obtained upon the addition of 20 ml. of aqueous saturated sodium acetate. One crystallization from ethanol yields pure 5-bromo-8-diazo-7,8-dihydro - 2 - tribromomethyl quinoline-7-one (2.1 g.), M.P. 171–3° C. with decomposition.

EXAMPLE 3

5,6 - dihydro - 5 - diazo - 8 - bromo - 2 - tribromomethylquinoline-6-one (M.P. 153–6° C. with decomposition) is prepared from 6 g. of an intermediate, 5-acetamido-6,8-dibromo-2-tribromomethyl quinoline (M.P. 221–2° C.), which is in turn prepared from 7 g. of 5-acetamidoquinaldine. All preparations are as described in Example 2.

EXAMPLE 4

6 - diazo - 6,7 - dihydro-2-tribromomethylbenzothiazole-7-one (M.P. 144–6° C. with decomposition) is prepared from 3 g. of an intermediate, 6-acetamido-7-bromo-2-tribromomethylbenzothiazole (M.P. 158–60° C.), which is in turn prepared from 21.6 g. of 6-acetamido-2-methylbenzothiazole. All preparations are as described in Example 1.

EXAMPLE 5

5,6-dihydro-6-diazo-2-trichloromethylquinoline-5-one is prepared from an intermediate, 6-acetamido-5-chloro-2-trichloromethyl quinoline, which in turn is prepared from 6-acetamidoquinaldine. A mixture of 6-acetamidoquinaldine (5.25 g.) and anhydrous sodium acetate (22.5 g.) in glacial acetic acid (80 ml.) is heated to 60° C. and chlorine gas is passed into the stirred solution. When excess chlorine is present, the temperature is raised to 95° C. and heating continued for 90 minutes. The reaction mixture is placed in water and the precipitated sticky solid is filtered off. One crystallization from boiling ethanol gives pure 6-acetamido-5-chloro-2-trichloromethyl quinoline (5 g.), M.P. 213–4° C. 6-acetamido-5-chloro-2-trichloromethyl quinoline (3 g.) is dissolved in 98% concentrated sulfuric acid (6 ml.) and heated on a steam bath for 10 minutes with stirring. The mixture is cooled to room temperature and solid sodium nitrite (0.62 g.) is added. The mixture is stirred for a further 60 minutes at room temperature and then poured onto ice (33 g.) The clear solution is kept for 15 minutes at 0° C. and then aqueous sodium acetate is added until the solution has a pH of 4. The yellow precipitate is filtered off and crystallized from alcohol to yield 1.8 g. of 5,6-dihydro-6-diazo-2-trichloromethylquinoline-5-one, M.P. 157° C. with decomposition.

EXAMPLE 6

The following series of reactions is employed to prepare 5,6 - dihydro-6-diazo-8-methyl-2-tribromomethyl quinoline-5-one. 2,8-dimethyl-6-nitroquinoline (43.2 g.) is reduced with stannous chloride dihydrate (270. g.) in concentrated hydrochloric acid using the method of Hamer (J. Chem. Soc. 119 1435) to give the 6-amino derivative (34 g.) which is recrystallized from methanol to give pure material, M.P 163–5° C. Treatment of the 6-amino-2,8-dimethylquinoline (29 g.) with acetic anhydride (170 ml.) in the normal manner gives the 6-acetamido derivative (36 g.). The product, after recrystallization from methanol has a M.P. 198–200° C. This 6-acetamido-2,8-dimethylquinoline (11.3 g.) is then reacted according to the reaction described for 6-acetamido-5-bromo-2-tribromomethyl quinoline in Example 1 to yield 19.39 g. of pure 6-acetamido-5-bromo-8-methyl - 2 - tribromomethylquinoline (19.3 g.; M.P. 172–3° C.). This acetamido derivative (5.3 g.) is then reacted in the same manner as the acetamidoquinoline of Example 1, yielding pure 5,6-dihydro-6-diazo-8-methyl-2-tribromomethylquinoline-5-one (2.45 g.; M.P. 120–1° C. with decomposition).

EXAMPLE 7

5,6 - dihydro-6-diazo-2-tribromomethylquinoline-5-one (0.05 g.) is dissolved in dichloromethane (5 ml.) and the solution impregnated onto filter paper and dried. The sample is exposed through an original pattern for 60 seconds to a 125 watt U.V. lamp held 18 inches from the exposing plane. The sample is then washed with water. In the exposed areas a print-out image is obtained which is water repellant and accepts a greasy lithographic printing ink. The wet unexposed areas do not accept the greasy ink.

EXAMPLE 8

A solution of 5,6-dihydro-6-dihydro-6-diazo-2-tribromomethyl-quinoline-5-one (0.1 g.) in dichloromethane (3 ml.) and dibutylphthalate (0.5 ml.) is added to a 10% aqueous solution of pigskin gelatin (10.0 ml.) containing sodium triisopropyl-naphthalenesulphonic acid (0.5 ml. of a 5% solution) and saponin (0.5 ml. of a 15% solution) as dispersion and coating aids. A uniform dispersion is obtained by treating the mixture for 5 minutes in a mixing blender. The dispersion is coated at a 4 mil thickness onto triacetate film base and is allowed to dry. The coating is then exposed for 2 minutes through an original pattern to a 125 watt U.V. lamp held 18 inches from the exposing plane. The exposed sample is washed with water at 35° C. which causes the gelatin in the unexposed areas to dissolve away. A negative gelatin relief image is obtained.

EXAMPLE 9

A sheet of flexible poly(ethylene terephthalate) copper laminate is whirler coated at 200 r.p.m. with the following solution:

Copoly(methylacrylate, N-acryloyl-N′-butyl glycinamide) in a molar ratio of 4:1—0.2 g.
5,6 - dihydro-6-diazo-2-tribromomethylquinoline-5-one—0.1 g.
Cyclohexanone—10 ml.

The coated layer, after drying, is exposed for 2 minutes through an original pattern to 4, 125 watt high pressure mercury vapor lamps, rich in ultraviolet light, placed 18″ from the exposing plane. Development is carried out by immersing the exposed photographic element in 1% sodium hydroxide for 20 seconds, followed by a water rinse and light swab with cotton wool. During development the exposed areas are removed, thus leaving a positive resist stencil which withstands 3 mins. etching in 38 degrees Bé. ferric chloride.

EXAMPLE 10

A sheet of the flexible laminate of Example 4 is whirler coated as outlined in Example 4, but with the following composition:

Poly(ethylene-cis-4-cyclohexene - 1,2 - dicarboxylate)—1 g.

5,6-dihydro-6-diazo-2-tribromomethyl quinoline-5-one—0.1 g.
Cyclohexanone—5 ml.
Ethyl alcohol—5 ml.

The dried coating, although slightly tacky, is exposed as in Example 9 for 2 minutes after which it is developed by immersion in a swabbing with a 10% trisodium phosphate solution. A positive polymer image is obtained, the polymer in the exposed areas being dissolved away. The developed resist stencil withstands 3 mins. spray etching with 38 degrees Bé. ferric chloride as in Example 9.

EXAMPLE 11

A sheet of flexible poly(ethylene terephthalate) copper laminate is whirler coated as in Example 9. To overcome tackiness of the layer produced in Example 10, a mixture of polyamide and polyester is used as follows:

Poly(ethylene-cis-4-cyclohexene-1,2-dicarboxylate)—0.7 g.
Copoly(methylacrylate, N-acryloyl-N′-butyl glycinamide) in molar ratio of 8:1—0.3 g.
5,6-dihydro-6-diazo-2-tribromomethyl quinoline-5-one—0.2 g.
Cyclohexanone—15 ml.

The dry non-tacky layer is exposed and processed as in Example 10, dissolving away the coated material in the exposed areas to provide a positive resist stencil. Excellent results are achieved by spray etching with ferric chloride as in Example 9.

EXAMPLE 12

A sheet of flexible poly(ethylene terephthalate)-copper laminate is coated as in Example 4, but with the following solution:

Poly(ethylene-cis-4-cyclohexene-1,2-dicarboxylate—1 g.
5,6-dihydro-6-diazo-2-tribromomethyl quinoline-5-one—0.2 g.
Cyclohexanone—6.5 ml.

The dry, non-tacky layer is exposed and developed as in Example 10. The exposed areas, however, are more difficult to remove than in the previous examples. Excellent results are obtained when the developed resist stencil is etched with ferric chloride as in Example 9.

EXAMPLE 13

A sheet of anodized aluminum is whirler coated at 200 r.p.m. with the following solution:

Copolyester of ethylene glycol and cis-4-cyclohexene-1,2-dicarboxylic anhydride (7 parts by weight) and hexachloro(2:2:1)bicycloheptene dicarboxylic anhydride (1 part by weight)—0.7 g.
Copoly(methylacrylate, N-acryloyl-N′-butyl glycinamide) in a molar ratio of 8:1—0.3 g.
5,6-dihydro-6-diazo-2-tribromomethyl quinoline-5-one—0.18 g.
Cyclohexanone—12 ml.

The dried layer is then exposed and developed as in Example 9, except that 10% aqueous trisodium phosphate is used as the developing solvent. During development the exposed areas are removed, thereby leaving a positive polymer image. The polymeric image is hydrophobic and accepts a greasy lithographic ink.

EXAMPLE 14

Light-sensitive elements are prepared, exposed and developed as in Example 13 except that equal weights of:

(a) 5-bromo-8-diazo-7,8-dihydro-2-tribromomethyl quinoline-7-one,
(b) 5,6-dihydro-5-diazo-8-bromo-2-tribromomethyl quinoline-6-one,
(c) 6-diazo-6,7-dihydro-2-tribromomethylbenzothiazole-7-one,
(d) 5,6-dihydro-6-diazo-2-trichloromethyl quinoline-5-one, and
(e) 5,6-dihydro-6-diazo-8-methyl-2-tribromomethyl quinoline-5-one are used in lieu of the 5,6-dihydro-6-diazo-2-tribromomethyl quinoline-5-one. Like results are obtained.

This invention has been described in detail, with particular reference to preferred embodiments thereof, but it will be understood that variations and modifications can be effected within the spirit and scope of the invention as described above and as defined in the appended claims.

We claim:

1. A photographic element comprising a support having coated thereon a light-sensitive layer comprising a 1,2-diazoketone trihalomethane having a formula selected from the group consisting of:

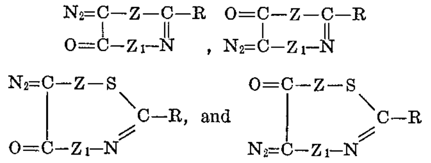

wherein R is a trihalomethyl radical and Z and $Z_1$ in combination with the atoms to which they are attached in said formula form a quinoline or benzothiazole nucleus.

2. A photographic element as described in claim 1 wherein the 1,2-diazoketone trihalomethane is selected from the group consisting of:

(a) 5,6-dihydro-6-diazo-2-tribromomethyl quinoline-5-one,
(b) 5-bromo-8-diazo-7,8-dihydro-2-tribromomethyl quinoline-7-one,
(c) 5,6-dihydro-5-diazo-8-bromo-2-tribromomethyl quinoline-6-one,
(d) 6-diazo-6,7-dihydro-2-tribromomethylbenzothiazole-7-one,
(e) 5,6-dihydro-6-diazo-2-trichlormethyl quinoline-5-one, and
(f) 5,6-dihydro-6-diazo-8-methyl-2-tribromomethyl quinoline-5-one.

3. A photographic element as described in claim 1 wherein the 1,2-diazoketone trihalomethane has a formula selected from the group consisting of:

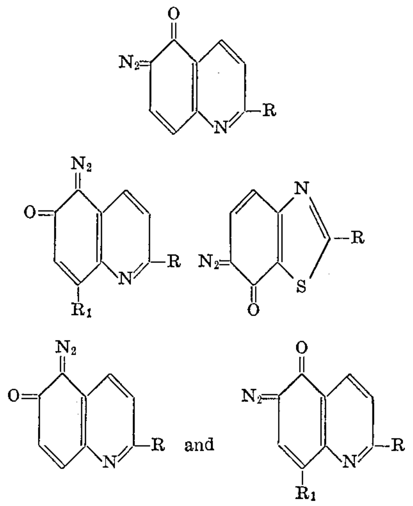

wherein R is a trihalomethyl radical and $R_1$ is selected from the group consisting of a halogen atom and a lower alkyl radical.

4. A photographic element comprising a support having coated thereon a light-sensitive layer comprising:

(1) about 50 to about 95 percent by weight of gelatin, and (2) about 5 to about 50 percent by weight of a 1,2-diazoketone trihalomethane having a formula selected from the group consisting of:

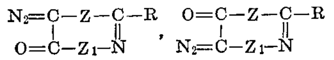

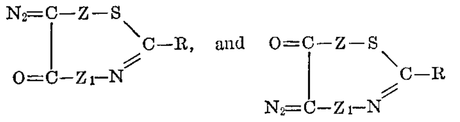

wherein R is a trihalomethyl radical and Z and $Z_1$ in combination with the atoms to which they are attached in said formula form a quinoline or benzothiazole nucleus.

5. A photographic element as described in claim 1 wherein the 1,2-diazoketone trihalomethane has a formula selected from the group consisting of:

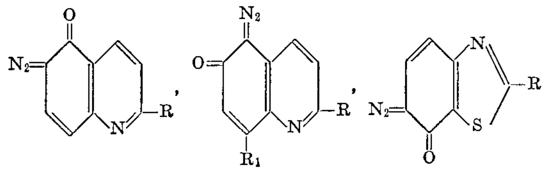

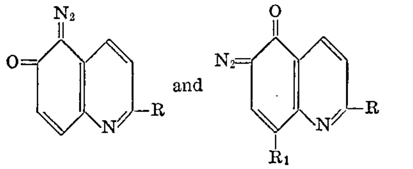

wherein R is a trihalomethyl radical and $R_1$ is selected from the group consisting of a halogen atom and a lower alkyl radical.

6. A photographic element as described in claim 4 wherein the 1,2-diazoketone trihalomethane is selected from the group consisting of:

(a) 5,6-dihydro-6-diazo-2-tribromomethyl quinoline-5-one,
(b) 5 - bromo - 8 - diazo-7,8-dihydro-2-tribromomethyl quinoline-7-one,
(c) 5,6 - dihydro - 5 - diazo-8-bromo-2-tribromomethyl quinoline-6-one,
(d) 6 - diazo - 6,7 - dihydro-2-tribromomethylbenzothiazole-7-one,
(e) 5,6-dihydro-6-diazo-2-trichloromethyl quinoline-5-one, and
(f) 5,6 - dihydro - 6 - diazo-8-methyl-2-tribromomethyl quinoline-5-one.

7. A photographic element comprising a support having coated thereon a light-sensitive layer comprising a sensitizing amount of a 1,2-diazoketone trihalomethane having a formula selected from the group consisting of:

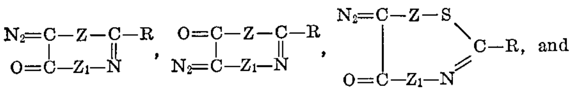

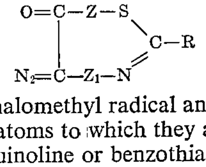

wherein R is a trihalomethyl radical and Z and $Z_1$ in combination with the atoms to which they are attached in said formula form a quinoline or benzothiazole nucleus, and a substantially alkali-insoluble poymer that, in the presence of said 1,2-diazoketone trihalomethane, is rendered alkali-soluble on exposure to light.

8. A photographic element as described in claim 7 wherein the polymer component is a polyester derived from a polyol and an unsaturated polycarboxylic acid.

9. A photographic element as described in claim 8 wherein the polyester is derived from:

(1) a polyol selected from the group consisting of lower alkane glycols, homopolymers and copolymers of polyhydroxy substituted lower alkyl acrylate esters, polyhydroxy substituted cyclic alkanes and polyhydroxy substituted carbohydrates, and
(2) an unsaturated polycarboxylic acid having a formula:

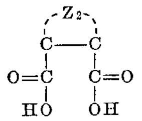

wherein $Z_2$ represents the atoms necessary to form an unsaturated carbocylic nucleus having 6 to 7 carbon atoms.

10. A photographic element as described in claim 9 wherein the polyester is poly(ethylene - 4 - cyclohexene-1,2-dicarboxylate).

11. A photographic element as described in claim 7 wherein the polymer is selected from the group consisting of (I) homopolymers of recurring acryloylpeptide units having a formula selected from the group consisting of:

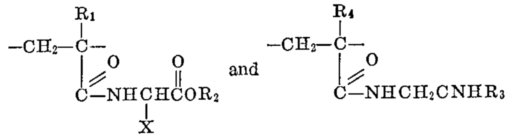

wherein:
(A) $R_1$ is selected from the group consisting of:
(1) a hydrogen atom and
(2) a methyl radical;
(B) $R_2$ is a lower alkyl radical;
(C) $R_3$ is selected from the group consisting of:
(1) an alkyl radical having up to seven carbon atoms, and
(2) a lower alkyl radical;

$$-CH_2\overset{\overset{O}{\|}}{C}OR_5$$

wherein $R_5$ is a lower alkyl radical;
(D) $R_4$ is selected from the group consisting of:
(1) a hydrogen atom, and
(2) a lower alkyl radical;
(E) X is selected from the group consisting of:

(1) $-CH_2CH_2\overset{\overset{O}{\|}}{C}OR_7$ wherein $R_7$ is a lower alkyl radical;
(2) a lower alkyl radical, and
(3) a hydrogen atom; and (II) copolymers comprising from 10 to 75 mole percent of at least one of said acryloylpeptide units and from 25 to 90 mole percent of at least one recurring unit having a formula selected from the group consisting of:

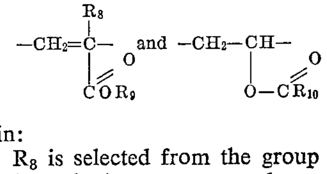

wherein:
(A) $R_8$ is selected from the group consisting of:
(1) a hydrogen atom, and
(2) a lower alkyl radical; and
(B) $R_9$ and $R_{10}$ are each lower alkyl radicals.

12. A photographic element as described in claim 11 wherein the polymer is copoly(methyacrylate, N-acryloyl-N'-butylglycinamide).

13. A photographic element as described in claim 7 wherein the 1,2-diazoketone trihalomethane has a formula selected from the group consisting of:

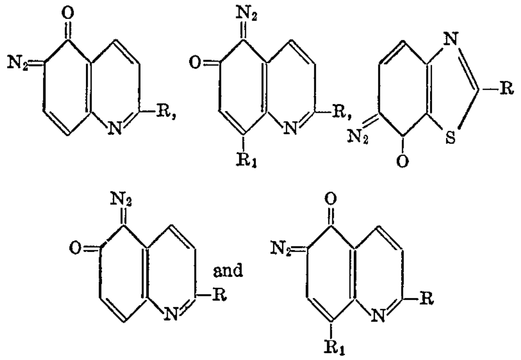

wherein R is a trihalomethyl radical and $R_1$ is selected from the group consisting of a halogen atom and a lower alkyl radical.

14. A photographic element as described in claim 7 wherein the 1,2-diazoketone trihalomethane is selected from the group consisting of:
 (a) 5,6 - dihydro - 6 - diazo - 2 - tribromomethyl quinoline-5-one
 (b) 5 - bromo - 8 - diazo - 7,8-dihydro-2-tribromomethyl quinoline-7-one,
 (c) 5,6 - dihydro - 5-diazo-8-bromo-2-tribromomethyl quinoline-6-one,
 (d) 6 - diazo - 6,7-dihydro-2-tribromomethyl benzothiazole-7-one,
 (e) 5,6-dihydro-6-diazo-2-trichloromethyl quinoline-5-one, and
 (f) 5,6 - dihydro - 6-diazo-8-methyl-2-tribromomethyl quinoline-5-one.

15. A photographic element comprising a support having coated thereon a light-sensitive layer comprising a substantially alkali insoluble polymer component that, in the presence of a 1,2-diazoketone trihalomethane, is rendered alkali soluble on exposure to light, said polymer component having at least one polymer selected from the group consisting of:
 (I) polyester derived from:
  (A) a polyol selected from the group consisting of lower alkane glycols, homopolymers and copolymers of polyhydroxy substituted lower alkyl acrylate esters, polyhydroxy substituted cyclic alkanes and polyhydroxy substituted carbohydrates, and
  (B) an unsaturated polycarboxylic acid having a formula:

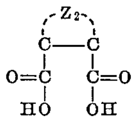

wherein $Z_2$ represents the atoms necessary to form an unsaturated carbocyclic nucleus having 6 to 7 carbon atoms, and
 (II) polymers selected from the group consisting of:
  (A) homopolymers of recurring acryloylpeptide units having a formula selected from the group consisting of:

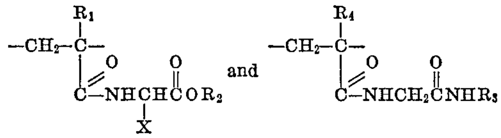

wherein:
   (1) $R_1$ is selected from the group consisting of:
    (a) a hydrogen atom and
    (b) a methyl radical;
   (2) $R_2$ is a lower alkyl radical;
   (3) $R_3$ is selected from the group consisting of:
    (a) an alkyl radical having up to seven carbon atoms, and
    (b) a radical having the formula $$-CH_2\overset{\overset{O}{\|}}{C}OR_5$$

wherein $R_5$ is a lower alkyl radical;
   (4) $R_4$ is selected from the group consisting of:
    (a) a hydrogen atom, and
    (b) a lower alkyl radical;
   (5) X is selected from the group consisting of:
    (a)

$$-CH_2CH_2\overset{\overset{O}{\|}}{C}OR_7$$

wherein $R_7$ is a lower alkyl radical;
    (b) a lower alkyl radical, and
    (c) a hydrogen atom; and
  (B) copolymers comprising from 10 to 75 mole percent of at least one of said acryloylpeptide units and from 25 to 90 mole percent of at least one recurring unit having a formula selected from the group consisting of:

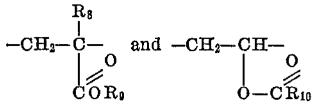

(1) $R_8$ is selected from the group consisting of:
    (a) a hydorogen atom, and
    (b) a lower alkyl radical; and
   (2) $R_9$ and $R_{10}$ are each lower alkyl radicals, and a 1,2-diazoketone trihalomethane having a formula selected from the group consisting of:

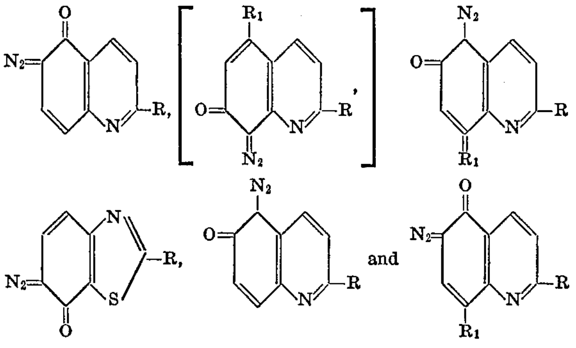

wherein R is a trihalomethyl radical and $R_1$ is selected from the group consisting of a halogen atom and a lower alkyl radical.

16. A photographic element comprising a support having coated thereon a light-sensitive layer comprising:
 (I) a polymer component comprising:
  (A) about 7 parts by weight of a mixture comprising about 7 parts by weight of a copolymer of ethylene glycol and 4-cyclohexene-1,2-dicarboxylic acid and about 1 part by weight of hexachloro-2:2:1-bicycloheptene dicarboxylic acid, and
  (B) from about 1 to about 3 parts by weight of a copolymer of methyl acrylate and N-acryloyl-N'-butylglycinamide in a molar ratio of 8:1, and
 (II) a sensitizing amount of a 1,2-diazoketone trihalomethane selected from the group consisting of:
  (a) 5,6 - dihydro - 6 - diazo - 2 - tribromomethyl quinoline-5-one, (b) 5 - bromo - 8 - diazo - 7,8 - dihydro - 2 - tribromomethyl quinoline-7-one, (c) 5,6 - dihydro - 5 - diazo - 8 - bromo - 2 - tribromomethyl quinoline-6-one, (d) 6 - diazo - 6,7 - dihydro - 2 - tribromomethyl benzothiazole-7-one, (e) 5,6 - dihydro - 6 - diazo - 2 - trichloromethyl quinoline-5-one, and (f) 5,6 - dihydro - 6 - diazo - 8 - methyl - 2 - tribromomethyl quinoline-5-one.

17. A photographic process for treating an imagewise exposed photographic element comprising a support having coated thereon a light-sensitive layer containing a 1,2-diazoketone trihalomethane having a formula selected from the group consisting of:

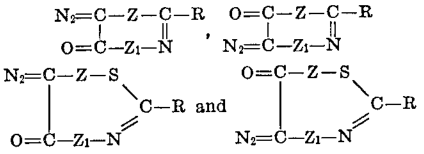

wherein R is a trihalomethyl radical and Z and $Z_1$ in combination with the atoms to which they are attached in said formula form a quinoline or benzothiazole nucleus to produce a lithographic master for photomechanical reproduction, which process comprises contacting said photographic element with water for a period of time sufficient to selectively hydrate the light-sensitive layer in the unexposed areas.

18. A photographic process for treating an imagewise exposed photographic element comprising a support having coated thereon a light-sensitive layer containing (1) about 50 to about 95 percent by weight of gelatin, and (2) about 5 to about 50 percent by weight of a 1,2-diazoketone trihalomethane having a formula selected from the group consisting of:

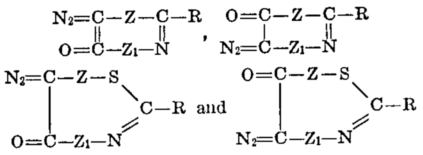

wherein R is a trihalomethyl radical and Z and $Z_1$ in combination with the atoms to which they are attached in said formula form a quinoline or benzothiazole nucleus, which process comprises contacting said photographic element with water for a period of time sufficient to selectively hydrate the light-sensitive layer in the unexposed areas.

19. A photographic process for treating an imagewise exposed photographic element comprising a support having coated thereon a light-sensitive layer comprising a sensitizing amount of a 1,2-diazoketone trihalomethane having a formula selected from the group consisting of:

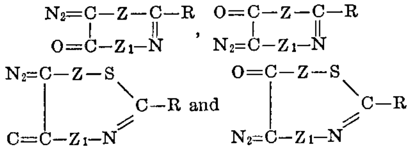

wherein R is a trihalomethyl radical and Z and $Z_1$ in combination with the atoms to which they are attached in said formula form a quinoline or benzothiazole nucleus, and a substantially alkali insoluble polymer that, in the presence of said 1,2-diazoketone trihalomethane, is rendered alkali soluble on exposure to actinic light, such process comprising treating said photographic element with an aqueous alkaline solution for a period of time sufficient to selectively remove the light-sensitive layer in the exposed areas, leaving an oleophilic polymer image corresponding to unexposed regions.

References Cited

UNITED STATES PATENTS

| | | | |
|---|---|---|---|
| 2,065,879 | 1/1933 | Ach et al. | 260—141 |
| 2,151,532 | 3/1939 | Schmidt et al. | 96—91 |
| 2,772,972 | 12/1956 | Herrick et al. | 96—91 |
| 2,859,112 | 11/1958 | Sus et al. | 96—91 |
| 2,994,608 | 8/1961 | Schmidt et al. | 96—91 |
| 3,154,559 | 10/1964 | Grotta et al. | 96—91 |
| 3,297,443 | 1/1967 | Schmerling | 96—91 |
| 3,312,554 | 4/1967 | Wagner et al. | 96—114 |
| 3,402,044 | 9/1968 | Steinhoff et al. | 96—91 |

FOREIGN PATENTS

| | | | |
|---|---|---|---|
| 772,517 | 4/1957 | Great Britain | 96—91 |
| 6,516,925 | 5/1960 | Netherlands | 96—91 |

OTHER REFERENCES

Chem Abstracts (I), vol. 49, 1728g, 1955.

Chem Abstracts II, vol. 50, 7828e–7831e, 1956.

Kosar J.: "Light-Sensitive Systems," pp. 336–352, 1965.

Landau: "Fasicules 1 à 8," p. 107, 1960.

NORMAN G. TORCHIN, Primary Examiner

C. L. BOWERS, Jr., Assistant Examiner

U.S. Cl. X.R.

96—36, 36.3, 36.4, 49, 75, 91, 90, 115; 260—141